United States Patent Office 3,045,857
Patented July 24, 1962

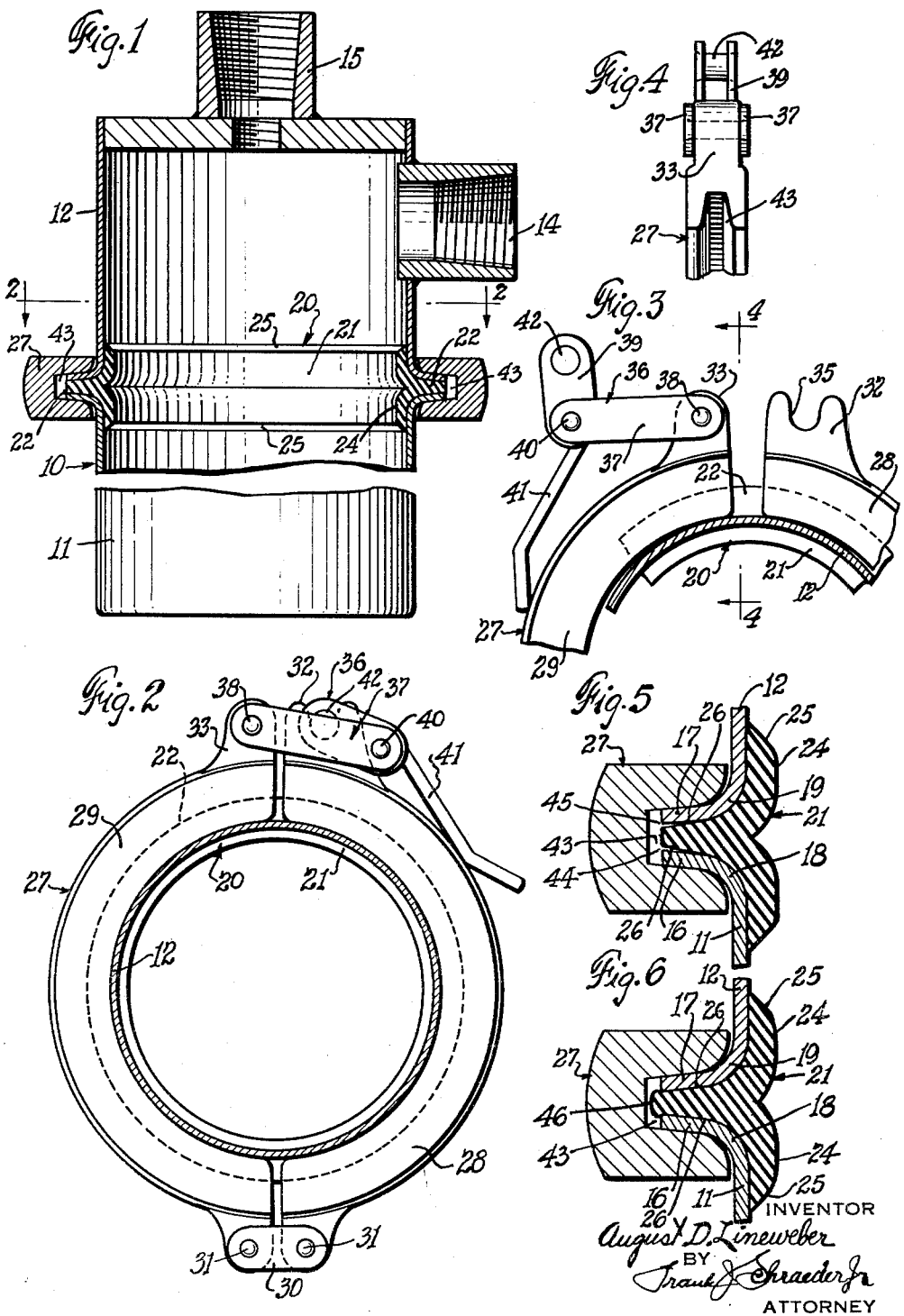

3,045,857
TANK AND HEAD CONNECTED BY A
DETACHABLE SEALER
August D. Lineweber, 3813 Pinkney St., Omaha, Nebr.
Filed Feb. 18, 1958, Ser. No. 715,967
4 Claims. (Cl. 220—5)

The present invention relates primarily to small two-piece tanks but is applicable to any structure that contains axially aligned cylindrical members such as pipes, shells or other containers for fluids which must be coupled together in a manner to provide sealed joints that are not only tight but permit such members coupled together and uncoupled without the use of tools, and without appreciably moving them relatively to each other in uncoupling.

A further characteristic of such joints should be that the tightness thereof be not affected by variation in the dimensions resulting from the need to allow tolerances that must be allowed in mass production of the members to be connected together.

The purpose of the present invention is the creation of a joint which shall fully meet the aforesaid requirements.

Heretofore one method of making joints of the general type under consideration has been to interpose between flanges on two members to be connected a gasket and to surround such members with a clamping ring that embraces the flanges, however, I have never seen any such prior joint that is leak proof when subjected to substantial fluid pressure.

Viewed in one of its aspects the present invention may therefore be said to have for its object such a modification of the last mentioned type of joint that will make same leak proof.

In carrying out my invention I employ a sealing ring made from rubber or rubber-like material; this ring comprising a body portion positioned within the two members to be joined and in contact with the walls of both members, together with a peripheral rib interposed between opposed flanges on said members; the angles between the flanges and those between the top and bottom faces of the rib being very small; and the parts being so proportioned that, with a clamping ring preventing the flanges from spreading apart, fluid pressure within said members causes the rib to be forced outwardly. This movement of the rib is the result of the soft body portion of the ring being pushed into the space between the flanges and, in effect, increasing the dimension of the rib in the radial direction. Actually, under fluid pressure, the rib is permitted to extrude from the space between the flanges and, being relieved of pressure against its top and bottom faces, expands and forms a head as illustrated in FIG. 6, that locks the rib against retraction in the radial direction.

The various features of novelty whereby the present invention is characterized will hereinafter be pointed out with particularity in the claims; but, for a full understanding of the invention and its objects and advantages, reference may be had to the following detailed description taken in connection with the accompanying drawing, wherein:

FIG. 1 is a view of a tank embodying the present invention, the upper part being an axial section and the lower part being in elevation, and shortened by having an intermediate portion broken away;

FIG. 2 is a section on line 2—2 of FIG. 1;

FIG. 3 is a view of a fragment of the tank, showing the clamping ring open;

FIG. 4 is a section on line 4—4 of FIG. 3;

FIG. 5 is a section on the same plane as the upper part of FIG. 1, showing only a portion of the structure but on a larger scale; and FIG. 6 is a view similar to FIG. 5, showing conditions which exist when there is fluid pressure in the tank.

In the drawing, the invention has been illustrated as applied to a small tank for housing a filter unit, not shown, and the following detailed description will be confined to this embodiment for the sake of brevity.

Referring to the drawing, 10 represents a cylindrical tank comprising a body section 11 and a head section 12; the latter section being adapted to suspend a filter unit (not shown) within the body section. There is an inlet 14 in the side of the head for water to be filtered, and an outlet 15 for filtering water in the top of the head.

The opposed ends of the two tank sections are flanged outwardly, as indicated at 16 and 17, respectively. These flanges are in the form of frustums of cones, the angles of which are large, preferably about 170°, so that the angle between the flanges is only about 10°. The flanges do not join the cylindrical walls abruptly but merge with the latter through smooth, uninterrupted portions 18 and 19, respectively, each of which is tangential to both the cylindrical wall and the flange between which it is interposed.

Cooperating with the two tank sections is a rubber or rubberlike sealing ring 20 which comprises a body portion 21 disposed within the tank and in engagement with the inner surfaces of both tank sections, together with a peripheral rib 22 extending into the space between the flanges. The ring in radial section is Y-shaped, the arms 24, 24 of the Y following the curvature of the rounded corners connecting the cylindrical walls of the tank sections to the flanges. The body portion of the sealing ring is champered at the periphery to create a marginal lip 25 which will hug the cylinder walls when subjected to fluid pressure. The upper and lower faces of the rib, 26, 26, are frustums of cones which are preferably of slightly smaller angles than the cones of which the flanges are frustums, as for example 169°.

With the sealing ring in place between the two tank sections, the connection between the latter is completed by a clamping ring 27 surrounding the tank and embracing the flanges.

The clamping ring illustrated consists of two half rings 28 and 29 hinged together. In the arrangement shown the hinge comprises a link device 30 interposed between and pivotally connected to each of two meeting half-ring ends, at 31, 31, together with means for securing together the second pair of meeting half ring ends or for permitting the ring to open when desired. This means includes two ears, 32 and 33, projecting radially from the second pair of half-ring ends. Ear 32 contains a notch 35 in its outer end. A toggle device 36 is connected at one end to ear 33. The toggle device comprises a first link 37 hinged at one end to ear 33 by a pin 38; a second link 39 connected at one end to the free end of the first link by a hinge pin 40; a lever arm 41 forming a rigid extension of the second link at the hinged end of the latter; and a pin 42 on the free end of the second link adapted to be seated in notch 35. Link 37 is preferably composed of two parallel members spaced apart, with link 39 positioned between them.

The clamping ring contains a groove 43 facing inwardly to receive the flanged portion of the tank. The groove is deep enough to prevent the flanges on the tank or the rib on the sealing ring from bottoming therein at any time. The shape of the groove is preferably such that the opposite sides thereof are at the same angle to each other as are the flanges.

In order to place the tank in a sealed condition the sealing ring is set into the top of the tank body with the rib resting on flange 16. The head section is then added, with its flange resting on the rib. The open clamping ring is then placed around the tank in embracing relation to the flanges. Lever arm 41 of the toggle device is then operated to insert pin 42 in notch 35 located in ear 32. Then, by swinging the lever arm past center about ear 32 as a fulcrum, it is made to rest on that half ring bearing said ear, as shown in FIG. 2, and lock the ring in its closed condition.

In this final assembly, illustrated in FIG. 1, the rib is preferably coextensive with the flanges. Furthermore, though the clamping ring has been tightened, the marginal portions of the rib faces preferably stand clear of the flanges, as shown in FIG. 5; there being slight gaps 44 and 45 between the rib and the lower and upper flanges, respectively. This insures that there will always be a seal, after the clamping ring has been applied, at the base of the rib, even though there be a departure from ideal dimensions in some or all of the elements in the structure as a whole.

When fluid is introduced into the tank and a pressure is built up, the soft material in the sealing ring yields and a part of the body portion is pushed into the space between the flanges. Eventually the gaps 44 and 45 will close and, as the pressure is increased within the tank, the material in the sealing ring will be extruded and, as shown in FIG. 6, will form a bead-like head 46 in engagement with the edges of both flanges. This bead or head serves to lock the rib against retraction until the clamping ring is opened.

While I have illustrated and described with particularity only a preferred form of my invention I do not desire to be limited to the exact details so illustrated and described; but intend to cover all forms and arrangements coming within the definitions of the invention constituting the appended claims.

I claim:

1. A tank comprising two separable cylindrical sections arranged in axial alignment with and in spaced relation to each other, the walls of said sections curving outwardly at opposite ends thereof and terminating in flanges that are frustums of cones the angles of which are about 170°, a resilient elastic sealing ring having a body portion within both sections and engaging said walls, the sealing ring also having a peripheral rib positioned between said flanges, said rib having opposite side faces defining frustums of cones, and a clamping ring surrounding the tank at and embracing said flanges, said clamping ring providing a channel receiving said flanges and said rib, said rib and flanges having radial dimensions substantially less than the radial dimensions of said channel to provide a space within said channel for accommodating the outer portion of said rib when the resilient rib is urged outwardly under the influence of fluid pressure acting upon said sealing ring within said tank.

2. A container for fluid including two separable cylindrical sections arranged in axial alignment and in spaced relation with each other, the walls of said sections at their opposing ends gradually curving outwardly and terminating in flanges of frusto-conical shape, said flanges sloping gradually toward each other with their outer margins spaced apart slightly less than their inner margins, an elastic sealing ring having a body portion disposed within and engaging the walls of both of said sections, said sealing ring also having a tapered rib extending outwardly between said flanges, said tapered rib having opposite surfaces defining frustums of cones the angles of which are less than those of said flanges, said opposite surfaces of said rib normally engaging said flanges adjacent the inner margins thereof and being spaced from said flanges adjacent the outer margins thereof when the fluid pressure within said container is relatively low, said opposite surfaces of said rib being sealingly engageable with said flanges adjacent both the inner and outer margins thereof when relatively high fluid pressure within said container urges said rib outwardly, and a detachable ring surrounding said container and embracing said flanges to prevent axial movement of said sections away from each other.

3. In a fluid container including a pair of axially aligned hollow cylindrical sections having spaced opposing ends provided with end walls curving outwardly and terminating in spaced peripheral flanges of frusto-conical configuration, each of said flanges defining the frustum of a cone having an angle of about 170°, a sealing assembly for sealing said sections together comprising a detachable ring having an annular channel receiving said end flanges therein for preventing axial movement of said sections away from each other, and a soft resilient and elastic sealing ring of Y-shaped cross section having a body portion disposed within said container and engaging the walls thereof, said sealing ring also having an outwardly tapered rib disposed between the opposing surfaces of said spaced flanges and having opposite side surfaces in contact with said flanges adjacent the junction of said rib and body portion, said rib having an outer end portion normally spaced from the bottom of said channel but being movable outwardly into the space adjacent the channel bottom when said rib is urged outwardly under the influence of fluid pressure acting upon said sealing ring within said container, the opposite side surfaces of said rib each defining the frustum of a cone having an angle less than the angle of the flange adjacent thereto, said opposite side surfaces of said tapered rib adjacent the end portion thereof normally being spaced from the surfaces of said flanges but being movable into sealing contact therewith when said rib is deformed by the outward force of pressure fluid acting upon said sealing ring within said container.

4. The structure of claim 3 in which said flanges have end surfaces spaced from the bottom of said channel, said end portion of said sealing ring protruding beyond the end surfaces of said flanges and expanding within the space between said flange and surfaces and the bottom of said channel when said rib is deformed under the influence of pressure fluid acting upon said sealing ring.

References Cited in the file of this patent

UNITED STATES PATENTS

| 421,088 | Tyler | Feb. 11, 1890 |
| 1,376,216 | Mittinger | Apr. 26, 1921 |
| 1,784,516 | Fairbanks | Dec. 9, 1930 |
| 2,403,364 | Hertzell | July 2, 1946 |
| 2,766,999 | Watts | Oct. 16, 1956 |

FOREIGN PATENTS

| 518,357 | Great Britain | Feb. 23, 1940 |
| 744,046 | Great Britain | Feb. 1, 1956 |